Aug. 25, 1936.　　　G. H. LELAND　　　2,051,954

TOOL CARRIER

Filed Nov. 5, 1934　　　2 Sheets-Sheet 1

INVENTOR-
GEORGE H. LELAND.
by
his ATTORNEY.

Patented Aug. 25, 1936

2,051,954

UNITED STATES PATENT OFFICE 2,051,954

TOOL CARRIER

George H. Leland, Dayton, Ohio, assignor of one-half to The Leland Electric Company, a corporation of Ohio Application November 5, 1934, Serial No. 751,533

47 Claims. (Cl. 77—58)

This invention relates to tool carriers and more particularly to means for absorbing vibratory energy of a tool carrier which is rotated at high speed, such as the tool carriers used in connection with high speed boring machines, internal grinders and the like where the openings in the work must be finished with extreme accuracy.

High speed boring machines, such as the so-called "diamond boring machine", are commonly used for finishing a bearing opening or the like to very close dimensions with a highly finished surface, and the opening must be accurate in diameter, roundness, straightness and in location with relation to other finished parts of the work piece in which the opening is being finished. High speed boring machines as heretofore constructed have been limited to the finishing of an opening the length or depth of which did not greatly exceed its diameter. Usually an opening having a length or depth more than two and one-half or three times its diameter could not be successfully finished on such a machine, due to the vibrations which were set up in the tool carrier by the drag of the tool on the work. Such a tool carrier is supported at one end only and the tool must be spaced from the support a distance not less than the length or depth of the opening which is to be finished and, of course, the cutter bar, or that part of the tool carrier which enters the opening, must be of a diameter substantially less than the diameter of the opening. When the length of the opening to be finished with relation to its diameter exceeds the above mentioned limit the bar which supports the tool must be of a length greatly exceeding its diameter and this permits of the vibration of the bar. These vibrations will not only increase in amplitude to such a degree as to interfere seriously with the quality and accuracy of the work to be done but will build up to such a degree as to damage the tool and even the tool carrier itself. In practice it has been found that if the cutter bar is of a length more than three or three and one-half times its diameter a critical limit is approached or encountered wherein the drag of the tool on the work tends to start a deflection of the cutter which soon grows into an accumulating vibration. When once started the amplitude of vibrations generally widens very rapidly until something breaks or the machine is shut down.

An analysis of the action of the tool indicates that the drag of the cut is slightly variable in its requirement for pressure or power and it soon begins to deflect the carrier in varying but very small amounts. These varying degrees of deflection will in turn place varying strains upon the cutter bar because of the varying depths of the drag of the tool upon the work. This accumulation of energy having no outlet through which it may be dissipated can only continue to increase and manifest itself in its increased amplitude of vibration until something breaks or the machine is shut down.

In some instances it has been proposed to use high speed machines for boring or finishing long openings or holes by providing the boring bar with an outboard or pilot bearing, that is, a bearing for the outer end thereof, but in many cases the use of an outboard bearing is impossible because of the character of the work and in all cases it is highly undesirable and makes it extremely difficult to secure accurate operation of the tool because of the fact that the outboard bearing must usually be shifted to permit the work to be placed in position and it is difficult to again position the same in absolute axial alinement with the cutter bar.

One object of the present invention is to provide a tool carrier for high speed machines which will be substantially free from vibration and chattering during the boring or finishing operation.

A further object of the invention is to provide such a tool carrier which will greatly increase the ratio of length to diameter of the opening which can be successfully finished.

A further object of the invention is to provide such a tool carrier which will be self-contained and which will eliminate the necessity for an outboard or pilot bearing such as is generally used on high speed machines when long holes or openings are to be bored or finished.

A further object of the invention is to provide such a tool carrier in which long or deep blind holes, that is, holes which are open at one end only, may be finished throughout their length.

A further object of the invention is to provide such a tool carrier which will be very simple in its construction and operation and which, when once installed, will not be liable to get out of order or to be injured in use.

Other objects of the invention will appear as the device is described in detail.

In the accompanying drawings Fig. 8 is a longitudinal section of the forward portion of a tool carrier equipped with still another form of vibration absorbing device.

In these drawings I have illustrated several embodiments of my invention but it will be understood that these embodiments have been chosen for the purpose of illustration only and that the invention may take various forms and may be utilized in connection with tools and tool carriers of various kinds, or in connection with other similar devices where it is desired to eliminate vibration.

In each of the several forms of the invention here illustrated the tool carrier is provided with means for absorbing and dissipating the vibratory energy of the cutter bar sufficiently early in its stages of accumulation to prevent injurious effects on the work or on the tool. This vibration absorbing means comprises a relatively stationary member supported by the tool carrier adjacent to the tool and in such a manner that the cutter bar may have transverse vibratory movement with relation to this relatively stationary member, means being provided to yieldably resist the transverse movement of the cutter bar with relation to the stationary element and thus absorb the vibratory energy of the cutter bar and cause the cutting edge of the tool to travel in a substantially true circle concentric with the axis of the tool carrier. Preferably the relatively stationary member is in the nature of an inertia element and radial clearance is provided between the same and the cutter bar to permit the transverse movement of the cutter bar with relation thereto, the inertia element and the cutter bar being provided with opposed friction surfaces to yieldably resist the movement of the cutter bar with relation to the inertia element. This inertia element is supported wholly by the tool carrier and has no connection with any other supporting means and has no contact with the wall of the opening. It is held by its inertia against any substantial transverse movement with the tool carrier and thus forms a support or pilot for the forward end of the tool carrier which is contained in the tool carrier itself. However, the resistance to the relative movement of the tool carrier and the inertia element may be so regulated that the latter will move with the tool carrier during vibrations of relatively narrow amplitude but when the vibrations tend to exceed the predetermined amplitude the tool carrier will move with relation to the inertia element against the action of the resisting medium, which will quickly check the excess vibrations and limit the same to an amplitude so narrow that they will not affect the quality of the work being done and the tool carrier will be retained throughout its length in substantially accurate alinement with its axis. In order that the most satisfactory results may be secured it is important that the proper relations shall exist between the weight of the inertia element and the weight of the tool carrier, and that the frictional resistance shall be in proper relation to the weight of these members. If the friction is too great it will tend to cause the inertia element to move with the cutter bar and any substantial movement of the inertia element with the cutter bar will correspondingly decrease the efficiency of the device. On the other hand if the friction is reduced to too small a value the vibrations of the cutter bar will not be completely absorbed and the work done will be of inferior quality. However, the friction should be established at such a value that it will not only absorb the vibrations due to the normal drag of the tool on the work but will absorb minor excesses of vibratory energy which may result from obstructions in the path of the tool, such as a hard spot in the metal, from initiating a vibration the amplitude of which will be beyond the capacity of the reduced friction to absorb the same. The adjustment of the frictional resistance is effected when the device is installed and will thereafter remain constant and require no adjustment or other attention.

Figures 1, 2, 3:
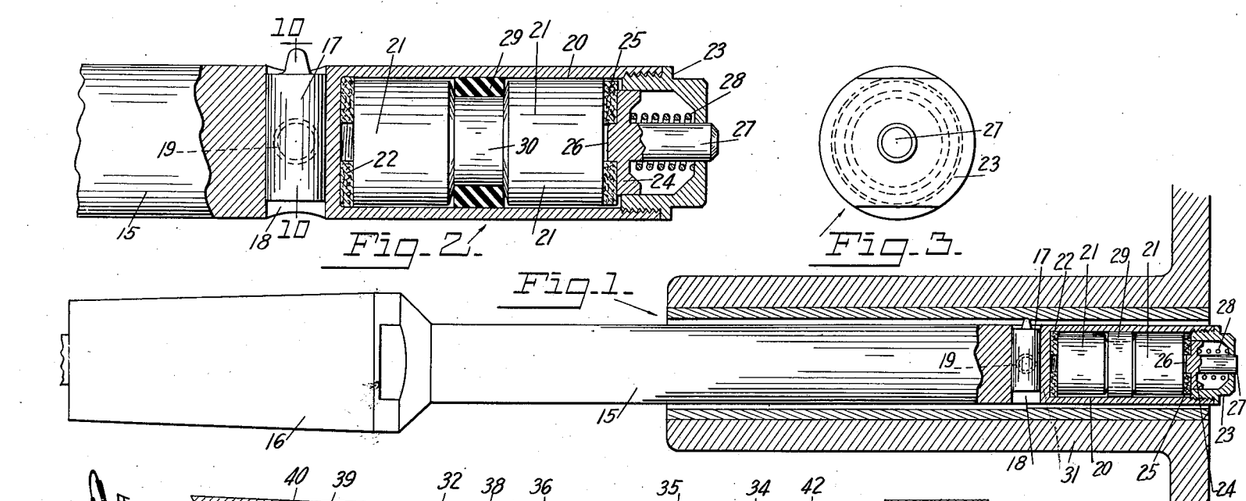
Fig. 1 is a side elevation, partly in section, of a tool carrier embodying my invention, showing the same in a partly finished piece of work.
Fig. 2 is a longitudinal sectional view of the vibration absorbing device.
Fig. 3 is an end elevation of the tool carrier.
Figure 4:
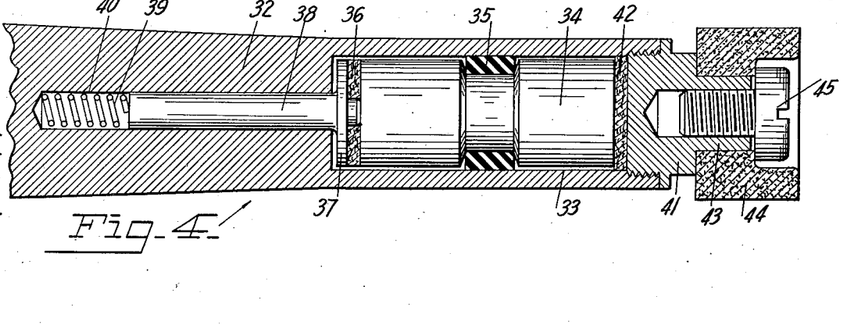
Fig. 4 is a longitudinal sectional view of a portion of a modified form of tool carrier equipped with a grinding wheel.
Figures 4, 5, 6, 7, 9, 10, 11, 12:
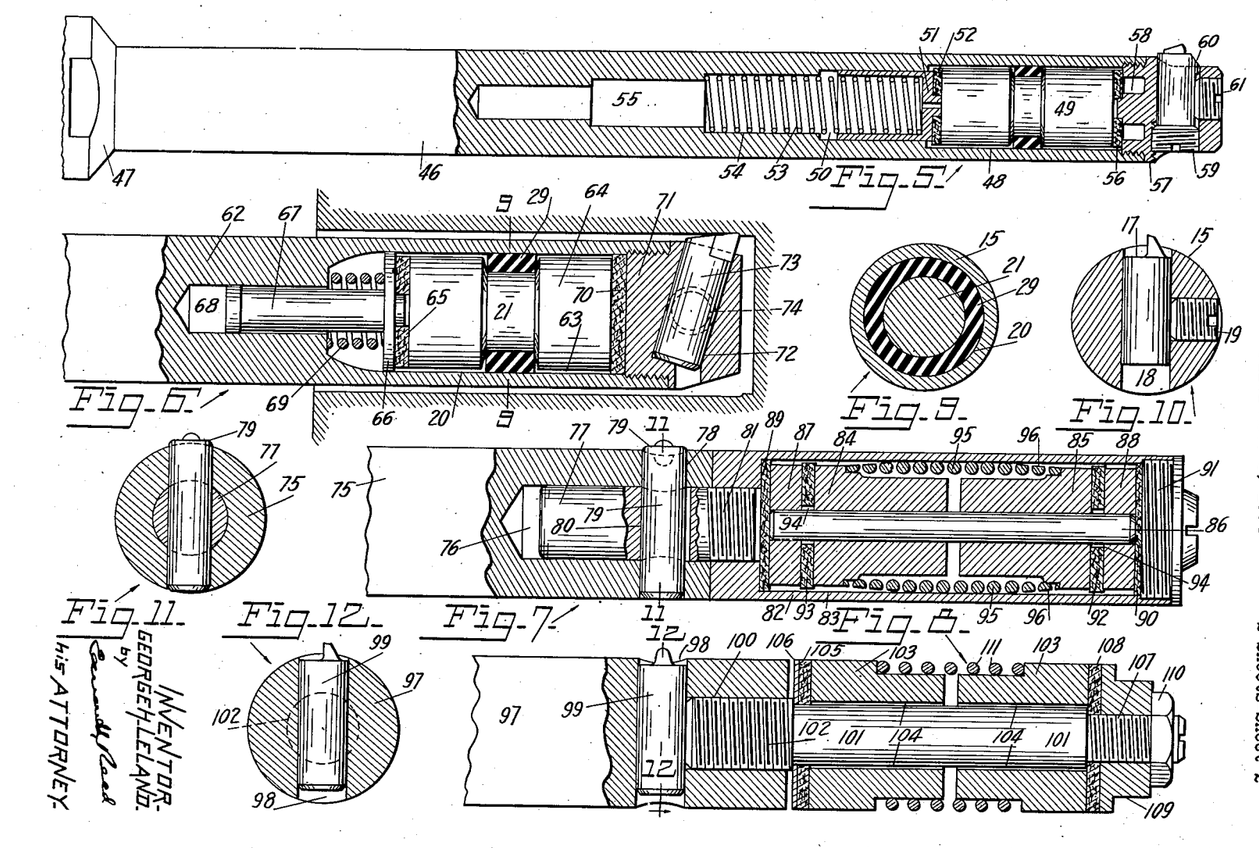
Fig. 5 is a side elevation, partly in section, of another form of tool carrier having a different arrangement of the vibration absorbing device.
Fig. 6 is a longitudinal sectional view of another form of tool carrier in which the cutting tool is arranged in advance of the vibration absorbing element.
Fig. 7 is a longitudinal section of the forward end of a tool carrier equipped with another form of vibration absorbing device.
Fig. 9 is a transverse sectional view taken on the line 9—9 of Fig. 6.
Fig. 10 is a transverse sectional view taken on the line 10—10 of Fig. 2.
Fig. 11 is a transverse sectional view taken on the line 11—11 of Fig. 7.
Fig. 12 is a transverse sectional view taken on the line 12—12 of Fig. 8.

The tool carrier, as shown in Figs. 1 and 5, comprises the tool supporting member 15, herein called the cutter bar, which has at one end an enlarged portion 16, preferably formed integral therewith, and adapted to be inserted in the rotating spindle of a high speed machine. The cutter bar is provided with means, usually near the outer end thereof, for supporting a tool 17 and, as here shown, it is provided with a transverse socket 18 in which the shank of the tool is mounted and in which it is held by a set screw 19, see Fig. 10. The tool carrier is rotated at high speed and may be moved axially through the work or it may be held against axial movement and the work moved into engagement with the tool thereon. Tool carriers of this kind are well known and in common use, with the exception that the length of the cutter bar has heretofore been definitely limited as above explained. It will be noted that the cutter bar as shown in Figs. 1 and 5 is of a long slender construction and that the tool is spaced from the enlarged end or support for the cutter bar a distance many times its diameter. If such a cutter bar was used without the vibration absorbing device it would vibrate to such an extent as to ruin the work and break the tool, a diamond pointed tool being particularly liable to injury under such conditions.

In Figs. 1 to 3 I have illustrated one embodiment of the invention in which the vibration absorbing device is integral with and forms a part of the cutter bar and is arranged in advance of the tool. As there shown, the cutter bar projects some distance in front of the tool socket and this forwardly projecting portion has a longitudinal bore which provides the same with an axial cavity 20 in which is mounted an inertia element 21. The inertia element is here shown as a cylindrical weight of a diameter slightly less than the internal diameter of the cavity to provide radial clearance between the weight and the wall of the cavity. Only a slight radial clearance is necessary and the clearance shown in the several drawings has been exaggerated for the purposes of illustration. In practice the clearance may be only a few thousandths of an inch, excellent results having been secured with a radial clearance of five one-thousandths of an inch. The weight and the cutter bar are provided with cooperating friction surfaces to yieldably resist the transverse movement of the cutter bar with relation to the weight. Preferably friction surfaces are provided at both ends of the weight and these surfaces should be in planes extending at right angles to the axis of rotation of the tool carrier in order that they may provide uniform resistance to the movement of the cutter bar with relation to the weight. In the present instance the flat ends of the cylindrical weights provide the friction surfaces therefor and friction elements, such as fiber disks, are interposed between the ends of the weight and the respective ends of the cavity. At least one of these friction disks is movable axially in the cavity and is yieldably pressed against the adjacent end of the weight to maintain the same in frictional contact therewith and to press the weight axially into engagement with the other friction disk. In the arrangement illustrated the rear friction disk 22 is fitted snugly into the rear end of the cavity so as to be held against transverse movement with relation thereto and bears against the rear wall of the cavity. The front end of the cavity is closed by a hollow screw plug 23 in which is slidably mounted a follower 24 on which the front friction disk 25 is supported. In the present instance the follower has a rearwardly extending stud 26 which enters a central opening in the friction disk and holds the same against transverse movement with relation to the follower, thereby enabling the disk to be of a diameter slightly less than the internal diameter of the cavity so that it can have free axial movement therein. The follower also has a forwardly extending stud or pin 27 which has a snug sliding fit in an opening in the front wall of the screw plug 23 so as to hold the follower against any tendency to tilt. A spring 28 is coiled about the stud 27 and confined between the follower and the front wall of the screw plug to press the follower inwardly and maintain the several friction surfaces in frictional contact, the tension of this spring being adjusted to provide the desired friction, as above explained.

It is desirable that the inertia element or weight 21 be maintained as nearly as possible in axial alinement with the tool carrier, the radial clearance being maintained about the entire circumference of the weight. Should the weight be moved off center, by the force of gravity, friction or otherwise, and permitted to operate off center the relative radial movement would be limited in one direction, resulting in a corresponding imperfection in the quality of the work. To maintain the inertia element normally in axial alinement with the tool carrier a resilient spacer is interposed between the inertia element and the circumferential wall of the cavity, this resilient spacer having sufficient resiliency to return the inertia element to its axial position when it has been displaced therefrom but being of such a character that it will not otherwise materially affect the movements of the cutter bar with relation to the inertia element. In the construction here illustrated this resilient spacer comprises a relatively thick band of soft rubber 29 interposed between the weight and the circumferential wall of the cavity and seated in a circumferential recess 30 formed in the weight approximately midway between its ends.

When this tool carrier is rotated at high speed and the tool enters the opening in the work piece, shown at 31 in Fig. 1, the drag of the tool on the work will tend to set up a vibration in the cutter bar but the inertia element will be retained, by its inertia, substantially stationary and the frictional contact between the inertia element and the friction disks will yieldably resist the transverse movement of the cutter bar with relation to the inertia element. This frictional resistance may permit a slight slippage of the disks on the weight but a balance is quickly built up between the accumulation of energy in the cutter bar and the absorption of energy by the friction element, at which point of balance the amplitude of vibration ceases to increase. By a proper regulation of the relative weights of the inertia element and the cutter bar and of the friction the amplitude of vibration may be so restricted that it is negligible and will not injuriously affect the work, much less result in injury to the tool.

In Fig. 4 there is shown a tool carrier equipped with a vibration absorbing device differing slightly from that shown in Figs. 1 and 2, which is provided with a grinding wheel instead of a cutting tool. In this figure a portion of the cutter bar is shown at 32 and is provided in its forward portion with a longitudinal cavity 33 in which is mounted an inertia element 34 similar to that above described and provided with a similar spacer 35. In this form of the device the rear friction disk 36 is carried by a follower 37 arranged in the rear end of the cavity and provided with a shank 38 which slides in a guideway 39 formed in the body of the cutter bar and in which is arranged a spring 40 which presses the shank and the friction disk 36 toward the inertia element. The forward end of the cavity is closed by a screw plug 41, the inner face of which forms an abutment against which the front friction disk 42 bears, this friction disk being fitted snugly into the cavity to hold it against transverse movement. The screw plug 41 has a reduced forward portion 43 on which is mounted a grinding wheel 44, the latter being held on the plug by a screw 45. The operation is the same as that above described.

In Fig. 5 I have shown a tool carrier so constructed as to materially reduce the normal tendency to vibrate as well as to absorb vibrations. It will be obvious that the heavier the outer or free end of the cutter bar the greater its tendency to vibrate and the greater the amplitude of the vibrations. Further, the greatest transverse strain is imposed upon the rear portion of the cutter bar near its point of connection with the enlarged supporting portion thereof. Consequently I have found that it is possible to materially lighten the forward portion of the cutter bar, and thus shorten the period of vibration, without objectionably weakening the bar as a whole, by making the same hollow for a substantial portion of its length. In the construction shown in Fig. 5 the cutter bar 46 is of uniform diameter from its point of connection with the enlarged supporting part 47 to the cutter. The forward end of the bar has been bored out to provide the same with a longitudinal cavity extending from its forward end to a point some distance beyond the middle of its length. Preferably the bore or cavity decreases in diameter toward its rear end so as to gradually increase the amount of metal remaining in the bar toward the rear thereof, a substantial portion of the bar being solid at the rear end thereof. In the present instance I have, for convenience in manufacture, shown the cavity as of stepped formation, that is, comprising a series of relatively short bores which successively decrease in diameter toward the rear of the bar. The foremost cavity, 48, contains the inertia element 49 which is similar in construction to the inertia element heretofore described. Slidably mounted in the next smaller cavity 50, at the rear of the cavity 48, is a follower 51 which carries the rear friction disk 52. This follower is preferably hollow and is provided with a relatively long skirt fitting snugly but slidably in the cavity 50 to hold the friction disk against tilting or transverse movement. A spring 53 has its forward portion mounted in the hollow follower and bearing against the forward end thereof and has its rear portion supported in the third section of the cavity, 54, and bearing against the shoulder formed between that section and the fourth section, 55. This arrangement enables a long spring to be used to press the friction disk against the rear end of the inertia element and to press the inertia element forwardly against the forward friction disk 56. The forward end of the cavity 48 is closed by a screw plug 57 which carries the friction disk 56, this screw plug being bored out, as shown at 58, to reduce the weight thereof. The screw plug projects beyond the forward end of the cutter bar proper and is provided with a transverse opening or socket 59 to receive the shank of the cutter 60 which is retained therein by a set screw 61. The cutter is here shown as spaced slightly to the rear of the forward end of the projection on the screw plug but this cutter may be arranged to cut to the full end of a blind opening by a proper arrangement thereof, such as that shown in Fig. 6.

In Fig. 6 there is shown a tool carrier designed primarily for boring or finishing blind openings. The cutter bar 62 is provided at its forward end with a cavity 63 in which is mounted the inertia element 64, the rear friction disk 65 is carried by a follower 66 having a shank or stem 67 extending into a bore or guideway 68 formed in the cutter bar to the rear of the cavity 63. The follower 66 is capable of axial movement in the rear portion of the cavity 63 and is pressed forwardly by a spring 69. The forward friction disk 70 bears against a fixed abutment formed by the inner end of the screw plug 71 which closes the forward end of the cavity and this screw plug is provided with an inclined opening or socket 72 to receive the shank of the tool 73, the arrangement being such that the cutting edge of the tool will lie flush with or slightly in front of the forward end of the tool carrier as a whole, thereby enabling it to finish a blind hole to the full end thereof. The cutter is retained in the socket by a set screw 74.

In the several forms of the tool carrier heretofore described the cavity which receives the inertia element has been formed in an integral part of the cutter bar but this is not essential as the cutter bar as a whole may comprise a separate and detachable part in which the cavity is formed. Such an arrangement is shown in Fig. 7 where the main part of the cutter bar, 75, is provided in its forward end with an axial bore 76 in which is mounted a slide block 77. The bar is provided near its forward end with a transverse opening or socket 78 to receive the shank of the tool 79 and the slide block 77 has a transverse opening 80 through which the shank of the tool extends. The forward end of the slide block projects beyond the end of the main bar and is screw threaded, as shown at 81. Arranged in line with this main part of the cutter bar, and forming a part of the cutter bar as a whole, is a hollow part or shell 82 having within the same a cavity 83. The rear wall of this cavity is of substantial thickness and is provided with a screw threaded opening to receive the threaded end of the slide block 77. Thus when the shell is screwed onto the slide block and tightened down against the end of the main part of the cutter bar not only is the shell rigidly secured to that bar but the slide block is drawn forward against the shank of the tool and the latter is firmly clamped in the cutter bar.

The inertia element here shown comprises two weights, 84 and 85, both of which are mounted on a rod 86 to maintain the same in alinement. Each weight is divided into two parts, the end portions, 87 of the weight 84 and 88 of the weight 85, being separate from the body portions of those weights, but being maintained in alinement therewith by the rod 86. The weights have snug sliding fit on the rod 86 so as to be capable of relative axial movement thereon but to be held against transverse movement with relation thereto. A friction disk 89 is seated in the rear end of the cavity formed in the shell 82 and held against transverse movement therein so as to have frictional contact with the rear surface of the end portion 87 of the rear weight. A friction disk 90 is fitted snugly in the forward end of the cavity and held therein by a screw plug 91 which closes the front end of the shell, and this friction disk, which is also held against transverse movement, has frictional contact with the front surface of the part 88 of the forward weight. Interposed between the two parts of the respective weights are friction disks 92 and 93 which are of a diameter slightly greater than the diameter of the respective weights and slightly less than the interior diameter of the shell. The openings 94 in the disks 92 and 93, through which the rod 86 extends, are of a diameter somewhat greater than the diameter of the rod 86 so that the disks may have transverse movement with relation to that rod. The adjacent end portions of the two weights are of reduced diameter and a spring 95 is coiled about these reduced portions and bears against the respective weights to force the same in opposite directions against the respective friction disks 89 and 90. Preferably a plurality of windings at each end of this spring are ground down to impart a taper to the respective ends of the spring, as shown at 96, so that the intermediate windings only of the spring contact with the shell. Thus the spring not only serves to maintain the weights in frictional contact with the end friction disks but also serves as the spacer to maintain the inertia element in axial alinement with the cutter bar and in spaced relation to the shell, and to hold the inertia element against any tendency to tilt. This construction of the inertia element provides a frictional resistance, to the transverse movement of the shell with relation to the inertia element, which increases with an increase in the amplitude of the vibrations. The initial vibrations of the cutter bar will cause the shell and friction disks 89 and 90 to move with relation to the end portions of the weights. As the amplitude of the vibrations increases the intermediate friction disks 92 and 93 will engage the shell and the further movement of the shell with relation to the weights will tend to move these intermediate disks with relation to the two parts of the respective weights, thereby materially increasing the resistance offered to the movement of the shell with relation to the weights. The spring 95 maintains the respective parts of the weights in firm engagement with both the end disks and the intermediate disks and during minor vibrations of the shell the end friction surfaces only will function but during excessive vibrations not only the end surfaces but the friction surfaces between two parts of each weight and its intermediate friction disk will also function, thus providing three friction surfaces for each weight.

While I prefer that the inertia element shall be enclosed within a cavity in the cutter bar so that it will be protected from injury and the entrance of dirt, this is not essential to the operation of the device and the inertia element may, if desired, be externally arranged. In Fig. 8 I have shown a very simple form of tool carrier in which the main part of the cutter bar, 97, is provided near its forward end with a socket 98 to receive the shank of the tool 99. The end of the bar, beyond the socket 98, is provided with a screw threaded axial opening 100 which, in the usual construction of the cutter bar, receives a set screw to secure the cutter in its socket. Arranged in axial alinement with the main bar and forming a continuation thereof, is a rod or elongated stud 101, of relatively small diameter, which may be rigidly secured to the bar in any suitable manner or, if desired, may be formed integral therewith. In the present instance, the rear end of this stud is slightly enlarged and screw threaded, as shown at 102, and may conveniently be made to fit within the screw threaded opening 100, when the set screw has been removed. Thus the threaded end of the stud may serve not only to support the stud in axial alinement with the bar but also to secure the tool in its socket. The inertia element comprises two weights 103 which are mounted on the stud 101 for axial movement with relation thereto, the bores through which the stud extends being of a diameter slightly greater than the stud to provide radial clearance, as shown at 104, which will permit the stud to move transversely with relation to the inertia element. A rear friction disk 105 is fitted snugly on the stud 101 so as to be held against transverse movement with relation thereto and is held against rearward movement by the shoulder formed between the body of the stud and the enlarged end 102 thereof. If desired, the disk may be backed by a metal washer 106. The forward end of the stud is of reduced diameter and screw threaded, as shown at 107, and a forward friction disk 108 is mounted on this reduced end portion and clamped against the end of the body of the stud by a disk or collar 109 which is held rigidly in place by a nut 110 on the threaded portion 107 of the stud. The adjacent ends of the two weights are of reduced diameter and a spring 111 is coiled about these end portions and serves to move the weights in opposite directions and to maintain the ends thereof in frictional contact with the respective friction disks. The operation is substantially the same as that heretofore described. The vibration of the cutter bar causes the stud to move transversely with relation to the inertia element and this movement is yieldably resisted by the friction surfaces, thereby causing the energy of the vibrations to be absorbed.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a tool carrier, a tool supporting bar supported at its rear end only and having in its forward portion a relatively long axial cavity the diameter of which gradually decreases toward the rear end thereof, an inertia element supported in the forward portion of said cavity in spaced relation to the longitudinal wall of said cavity, means to yieldably resist the transverse movement of said bar with relation to said inertia element, and a tool carried by said bar in front of said inertia element.

2. In a tool carrier, a tool supporting bar supported at its rear end only and having in its forward portion a relatively long axial cavity the diameter of which gradually decreases toward the rear end thereof, an inertia element supported in the forward portion of said cavity in spaced relation to the longitudinal wall of said cavity and having friction surfaces at each end thereof, a friction element supported in said cavity at each end of said inertia element and held against transverse movement with relation to said bar, means to maintain said inertia element in frictional contact with both friction elements, and a tool carried by the forward portion of said bar.

3. In a tool carrier, a tool supporting bar supported at its rear end only and having in its forward portion a relatively long axial cavity the diameter of which gradually decreases toward the rear end thereof, an inertia element supported in the forward portion of said cavity in spaced relation to the longitudinal wall of said cavity and having a friction surface at each end thereof, a follower slidably mounted in said cavity in the rear of said inertia element, held against transverse movement with relation to said bar and provided with a friction surface opposed to the adjacent friction surface of said inertia element, a spring acting on said follower to press the same toward said inertia element, a closure for the forward end of said cavity provided with a friction surface opposed to the adjacent friction surface of said inertia element, and a tool carried by said closure.

4. In combination with an elongate tool carrier having one end adapted to be secured to a rotatable support and having its other end portion free and susceptible to transverse vibrations, and a tool rigidly secured to said tool carrier near the free end thereof, a device for absorbing transverse vibrations carried by said tool carrier near the free end thereof, substantially in axial alinement therewith and of a diameter less than the diameter of the circle described by the cutting edge of the tool to enable it to enter the opening in which said tool operates.

5. In combination with an elongate tool carrier having one end adapted to be secured to a rotatable support, having its other end portion free and susceptible to transverse vibrations and having near its free end means for fixedly supporting a tool thereon, an inertia element carried by said tool carrier near said free end thereof, adapted to enter the opening in which said tool operates and so connected with said tool carrier that it will absorb transverse vibrations thereof.

6. In combination with an elongate tool carrier having one end adapted to be rigidly secured to a rotatable support, having its other end portion free and susceptible to transverse vibrations and having near its free end means for fixedly supporting a tool thereon, an inertia element carried by said tool carrier near the free end thereof and adapted to enter the opening in which said tool operates, said inertia element and said tool carrier being capable of limited relative transverse movement and having means to yieldably resist said relative movement and cause said inertia element to absorb transverse vibrations of said tool carrier.

7. In combination with an elongate tool carrier having one end adapted to be secured to a rotatable support and having its other end portion free and susceptible to transverse vibrations, said free end portion having means for fixedly supporting a tool, an energy absorbing element, the free end portion of said tool carrier and said element being supported for relative movement transverse to the axis of said tool carrier and having means for so connecting the same that said element will resist the transverse movement of said tool carrier and thereby limit the amplitude of the vibrations thereof.

8. In a vibration absorbing device for an elongate tool supporting bar having one end adapted to be secured to a rotatable support and having its other end portion free and provided with means to fixedly support a tool, an inertia element near the free end of said bar, a part rigid with said bar and arranged for transverse movement with relation to said inertia element, and nonresilient means to yieldably resist the transverse movement of said rigid part with relation to said inertia element.

9. In a vibration absorbing device for an elongate tool supporting bar having one end adapted to be secured to a rotatable support and having its other end portion free and provided with means to fixedly support a tool, an inertia element near the free end of said bar, a part rigid with said bar and arranged for transverse movement with relation to said inertia element, said part and said element having cooperating friction surfaces to resist the movement of said rigid part with relation to said inertia element.

10. In combination with an elongate tool carrier having one end adapted to be secured to a rotatable support and having its other end portion free and susceptible to transverse vibrations, said free end portion being provided with means to fixedly support a tool, a weight arranged substantially in axial alinement with said tool carrier and so supported by said tool carrier that the latter may have limited transverse movement with relation thereto, and means for yieldably resisting said transverse movement of said tool carrier.

11. In combination with an elongate tool carrier having one end adapted to be secured to a rigid support and having its other end portion free and susceptible to transverse vibrations, said free end portion having means to fixedly support a tool, a weight arranged substantially in axial alinement with said tool carrier near the free end thereof and so supported by said tool carrier that the latter may have limited transverse movement with relation thereto, and frictional means for resisting said transverse movement of said tool carrier.

12. In combination with an elongate tool carrier having one end adapted to be secured to a rigid support and having its other end portion free and susceptible to transverse vibrations, said free end portion having means to fixedly support a tool, a weight arranged substantially in axial alinement with said tool carrier near the free end thereof and so supported by said tool carrier that the latter may have limited transverse movement with relation thereto, said weight and said tool carrier having opposed transverse surfaces, and yieldable means for retaining said surfaces in frictional contact one with the other.

13. In combination with an elongate tool carrier having one end adapted to be secured to a rotatable support and having its other end portion free and susceptible to transverse vibrations, said free end portion having means to fixedly support a tool, said tool carrier also having near its free end a part forming a support for a weight, a weight mounted on said part for axial movement with relation thereto, lateral clearance being provided between said weight and said part to permit said tool carrier to move transversely with relation to said weight, said weight having at one end a transverse friction surface and said part of said tool carrier having a transverse friction surface opposed to the friction surface of said weight, and means for pressing one of said friction surfaces against the other friction surface.

14. In combination with an elongate tool carrier having one end adapted to be secured to a rotatable support and having its other end portion free and susceptible to transverse vibration, said free end portion having means to fixedly support a tool, said tool carrier also having near its free end a part forming a support for a weight, a weight mounted on said part for axial movement with relation thereto, lateral clearance being provided between said weight and said part to permit said tool carrier to move transversely with relation to said weight, said weight having at each end thereof a transverse friction surface, said part of said tool carrier having transverse friction surfaces opposed to the respective friction surfaces of said weight, and means for pressing the respective friction surfaces into engagement one with the other.

15. In combination with an elongate tool carrier having one end adapted to be secured to a rotatable support and having its other end portion free and susceptible to transverse vibration, said free end portion having means to fixedly support a tool, said tool carrier also having near its free end a part forming a support for a weight, a weight mounted on said part for axial movement with relation thereto, lateral clearance being provided between said weight and said part to permit said tool carrier to move transversely with relation to said weight, said weight having at each end thereof a transverse friction surface, said part of said tool carrier having at one end of said weight a transverse friction surface and having at the other end of said weight an axially movable part having a transverse friction surface, and means acting on said axially movable part to press the same into engagement with the adjacent friction surface of said weight and to press said weight into engagement with the friction surface of said tool carrier at the other end thereof.

16. In combination with an elongate tool carrier having one end portion adapted to be secured to a rotatable support and having its other end free and susceptible to transverse vibrations, said free end portion having means to fixedly support a tool, said tool carrier having near its free end a part forming a weight support, two alined weights mounted on said part for axial movement with relation thereto, lateral clearance being provided between said weights and said part to permit said tool carrier to move transversely to said weights, each weight having at its outer end a transverse friction surface, said part of said tool carrier having transverse friction surfaces opposed to the friction surfaces of said weights, and yieldable means for pressing said weights into frictional contact with the respective friction surfaces of said tool carrier.

17. In a vibration absorbing device for a tool supporting bar having one end adapted to be secured to a rotatable part and having its other end portion free and susceptible to transverse vibration, said free end portion having means to fixedly support a tool, an inertia element, an element separate from said bar and having means for rigidly securing the same to said bar in axial alinement therewith and arranged for transverse movement with relation to said inertia element, and means to yieldably resist the movement of said rigid element with relation to said inertia element.

18. In combination with an elongate tool supporting bar having one end adapted to be secured to a rotatable support and having its other end portion free and susceptible to transverse vibration, said bar also having a transverse opening near the free end thereof, and a tool having a shank mounted in said opening, a vibration absorbing device comprising an inertia element, a second element arranged for transverse movement with relation to said inertia element, means to resist the movement of said second element with relation to said inertia element, and means for rigidly connecting said element with said bar, said connecting means having a part to act on the shank of said tool to secure the latter in the opening of said bar.

19. An elongate tool carrier having one end adapted to be secured to a rotatable support and having its other end portion free for transverse vibration and provided with means to fixedly support a tool, said tool carrier having an axial cavity near the free end thereof, an inertia element mounted in said cavity and spaced from the longitudinal wall thereof to permit said wall to have transverse movement with relation thereto, and means for yieldably resisting the transverse movement of said part of said tool carrier with relation to said inertia element.

20. In a rotatable tool carrier, a tool supporting bar having one end adapted to be secured to a rotatable support having its other end portion free and adapted to fixedly support a tool, said free end portion having a part provided with an axially arranged cylindrical cavity, an inertia element mounted in said cavity and having a cylindrical portion of a diameter less than the diameter of said cavity, and means to yieldably resist the transverse movement of said part of said bar with relation to said inertia element.

21. In a rotatable tool carrier, a tool supporting bar having one end adapted to be secured to a rotatable support and having its other end portion free for transverse vibration and adapted to fixedly support a tool, said free end portion having an axial cavity, an inertia element mounted in said cavity for movement lengthwise thereof and in spaced relation to the longitudinal wall thereof, said inertia element having a transverse friction surface, a friction element supported in said cavity in opposed relation to said friction surface and held against transverse movement in said cavity, and means acting on one of said elements to press the same into frictional contact with the other element.

22. In a rotatable tool carrier, a tool supporting bar having one end adapted to rotate about a fixed axis and having its other end portion free and susceptible to transverse vibrations, the vibratory portion of said bar having means to fixedly support a tool and having a part projecting forwardly from said tool supporting means, said free end portion also being provided with an axial cavity, an inertia element supported in said cavity in spaced relation to the longitudinal wall thereof and having a transverse friction surface, and a part arranged in said cavity, held against transverse movement with relation thereto and having a friction surface in contact with the friction surface of said inertia element.

23. In a rotatable tool carrier, a tool supporting bar having one end adapted to rotate about a fixed axis and having its other end portion free and susceptible to transverse vibrations, the vibratory portion of said bar having means to fixedly support a tool and having a part projecting forwardly from said tool supporting means, an inertia element supported in radially spaced relation to said part of said bar to permit said part to have transverse movement with relation thereto, and means to yieldably resist said transverse movement of said part of said bar.

24. In a rotatable tool carrier, a tool supporting bar having one end adapted to be rotated about a fixed axis and having its other end free and susceptible to transverse vibration, the vibratory portion of said bar having means to fixedly support a tool, a detachable part rigidly secured to the free end of said bar and projecting forwardly from said tool supporting means, an inertia element supported in radially spaced relation to said part of said bar to permit said part to have transverse movement with relation thereto, and means to yieldably resist said transverse movement of said part of said bar.

25. In a rotatable tool carrier, a tool supporting bar having one end adapted to be rotated about a fixed axis and having its other end portion free and susceptible to transverse vibrations, the vibratory portion of said bar having means to support a tool and having an axial cavity in the rear of and adjacent to said tool supporting means, an inertia element supported in said cavity in spaced relation to the longitudinal wall thereof, and means to yieldably resist the transverse movement of said bar with relation to said inertia element.

26. In a rotatable tool carrier, a tool supporting bar having one end adapted to be rotated about a fixed axis having its other end portion free and susceptible to transverse vibrations, said free end portion of said bar having means to fixedly support a tool and having a relatively long axial cavity the diameter of which gradually decreases toward the rear end thereof, an inertia element supported in the forward portion of said cavity in spaced relation to the longitudinal wall of said cavity, and means to yieldably resist the transverse movement of said bar with relation to said inertia element.

27. An elongate tool carrier having one end adapted to be secured to a rotatable support and having its other end portion free and susceptible to transverse vibrations, said free end portion being provided with means to fixedly support a tool and having an axial cavity, an inertia element mounted in said cavity and spaced from the longitudinal wall thereof, means for resisting the transverse movement of said portion of said tool carrier with relation to said inertia element and yieldable means tending to retain said inertia element substantially in axial alinement with said tool carrier.

28. An elongate tool carrier having one end adapted to be secured to a rotatable support and having its other end portion free and susceptible to transverse vibrations, said free end portion being provided with means to fixedly support a tool and having an axially arranged cylindrical cavity, an inertia element mounted in said cavity and having a cylindrical portion of a diameter less than the diameter of said cavity, frictional means to yieldably resist the transverse movement of said part of said portion of said bar with relation to said inertia element, and a resilient spacer interposed between said inertia element and the circumferential wall of said cavity.

29. In a tool carrier, a tool supporting bar having one end adapted to rotate about a fixed axis and having its other end portion free for vibratory movement and provided with means to fixedly support a tool, said free end portion having an axial cavity, an inertia element supported in said cavity in spaced relation to the longitudinal wall thereof, and means to yieldably resist the transverse vibrations of said bar with relation to said inertia element and to increase said resistance as the amplitude of said vibrations increases.

30. In a tool carrier, a tool supporting bar having one end adapted to rotate about a fixed axis and having its other end portion free for vibratory movement and provided with means to fixedly support a tool, said free end portion having an axial cavity, an inertia element supported in said cavity in spaced relation to the longitudinal wall thereof, frictional means to resist the transverse vibrations of said bar with relation to said inertia element, and other frictional means to increase said resistance when the amplitude of said vibrations exceeds a predetermined amplitude.

31. In a tool carrier, a tool supporting bar having one end adapted to rotate about a fixed axis and having its other end free for vibratory movement and provided with means to fixedly support a tool, and also provided with an axial cavity, an inertia element supported in said cavity in spaced relation to the circumferential wall thereof, said inertia element comprising a weight divided transversely into two parts which are movable axially with relation one to the other, a friction element engaging one end of said weight and held against transverse movement with relation to said bar, a second friction element arranged between the two parts of said weight and having its edge projecting beyond said weight and spaced normally from the longitudinal wall of said cavity, whereby said second friction element will remain in fixed relation to said weight until it is engaged by the wall of said cavity and actuated thereby, and means for maintaining frictional contact between said weight and said friction elements.

32. In a tool carrier, a tool supporting bar having one end adapted to be supported for rotation about a fixed axis and having its other end free for vibratory movement and provided with means to fixedly support a tool, said free end portion of said bar having a part to support an inertia element, an inertia element supported by said part of said bar in radially spaced relation thereto to permit the transverse movement of said bar with relation to said element, a friction element having contact with said inertia element and held against transverse movement with relation to said bar, a second friction element having contact with said inertia element and arranged to be engaged by said part of said bar and moved with relation to said inertia element when the transverse movement of said bar exceeds a predetermined limit, and means for maintaining frictional contact between said inertia element and said friction elements.

33. In a tool carrier, a tool supporting bar having one end adapted to be supported for rotation about a fixed axis and having its other end portion free for vibratory movement and provided with means to fixedly support a tool, said free end portion also having a part to support an inertia element, an inertia element supported by said part of said bar in radially spaced relation thereto to permit the transverse movement of said bar with relation to said inertia element, said inertia element comprising two weights arranged for axial movement with relation one to the other and with relation to said part of said bar, friction elements mounted in opposed relation to the outer ends of the respective weights and held against transverse movement with relation to said bar, and spring means acting on the inner ends of said weights to press the outer ends thereof against the respective friction elements.

34. In a tool carrier, a tool supporting bar having one end adapted to be supported for rotation about a fixed axis, having its other end free for transverse vibratory movement and provided with means to fixedly support a tool, said free end portion of said bar having at its end a forwardly projecting stud of relatively small diameter, an inertia element mounted about said stud in radially spaced relation thereto to permit said stud to move transversely with relation to said inertia element, and means to frictionally resist the transverse movement of said stud with relation to said inertia element.

35. In a tool carrier, a tool supporting bar having one end adapted to be supported for rotation about a fixed axis and having its other end portion free for transverse vibration and provided with means to fixedly support a tool, said free end portion having a relatively long axial cavity to reduce the weight thereof, an inertia element so supported by the forward portion of said bar that the latter may move transversely with relation thereto, and means for yieldably resisting the transverse movement of said bar with relation to said inertia element.

36. In a rotatable tool carrier, a tool support having one end adapted to be supported for rotation about a fixed axis and having its other end portion free and provided with means to fixedly support a tool, said free end portion having a transverse vibration period of relatively high frequency, and an inertia element cooperating with said free end portion to lower the frequency of said vibration period and to limit the amplitude of the same to a predetermined value.

37. In a rotatable tool carrier, a tool support of relatively light weight having one end adapted to be supported for rotation about a fixed axis and having its other end free for transverse vibration and provided with means to fixedly support a tool, a relatively heavy inertia element and means cooperating with said tool support and said inertia element to cause said inertia element to move with said free end portion of said tool support when the latter is moved through a relatively narrow amplitude of vibration and to permit said tool support to have restricted movement with relation to said inertia element when said tool support tends to move through a relatively wide amplitude of vibration.

38. In a rotatable tool carrier, a tool supporting member adapted to be supported for rotation about a fixed axis and having a part adapted to fixedly support a tool, said part being susceptible to transverse vibration and adapted to vibrate at a relatively low frequency at a narrow amplitude and at a relatively high frequency at a relatively wide amplitude, and means tending to retain the vibrations of said tool supporting member in said relatively low frequency of vibration with its attendant narrow amplitude.

39. In a high speed machine for accurately finishing an elongate hole in a work piece, a tool support adapted to be secured to a high speed rotatable supporting element and having a portion susceptible to transverse vibration, a cutter fixedly secured to said portion of said tool support for rotation thereby at high speed as it moves through said hole, and means cooperating with said tool support to absorb and dissipate the transverse vibratory energy accumulated by the drag of said cutter upon the work piece.

40. In a high speed machine for accurately finishing an elongate hole in a work piece, a tool support adapted to be secured to a rotatable supporting element and rotated thereby at high speed as it moves through said hole, said tool support having a portion susceptible to transverse vibration and provided with means for fixedly supporting a tool, means supported by said tool support to absorb and dissipate the transverse vibratory energy accumulated by said support.

41. In a high speed machine for accurately finishing an elongate hole in a work piece, which hole is closed at one end, a tool support having one end adapted to be secured to a rotatable supporting element and having its other end portion free and provided with means to fixedly support a tool and to carry said tool at high rotary speed through the length of said hole to its closed end, said free end portion being susceptible to the transverse vibrations, and means cooperating with the free end portion of said tool support to maintain the same in accurate alinement with the axis of said tool support.

42. In a high speed machine of the character described, an elongate rotary tool carrier having one end adapted to be rigidly secured to a rotatable supporting element and having its other end portion susceptible to transverse vibration and adapted to fixedly support a tool, and self-contained means internal of said rotary tool carrier to limit the amplitude of said vibration.

43. In a high speed machine for accurately finishing an elongate hole in a work piece, an elongate tool carrier having one end adapted to be secured to a rotatable support driven by said machine and having its other end portion adapted to fixedly support a tool and carry the same through the length of said hole, said tool carrying portion being susceptible to transverse vibration, and means arranged internally of said elongate tool carrier adjacent to the tool carrying portion thereof to maintain said tool carrying portion in substantial alinement with the axis of said tool carrier.

44. In a high speed machine for accurately finishing an elongate hole in a work piece, an elongate rotary tool carrier having one end adapted to be secured to a rotatable support and having its other end portion adapted to fixedly support a cutting tool and carry the same through the length of said hole, said tool supporting portion being susceptible to transverse vibration, and means rotating with said carrier adjacent to said tool supporting portion thereof to maintain said portion in substantial alinement with the axis of said tool carrier.

45. In a high speed machine for accurately finishing an elongate hole in a work piece, an elongate rotary tool carrier having one end adapted to be secured to a rotatable support and having its other end portion susceptible to transverse vibration and adapted to carry a cutter point at high rotary speed through said work piece, a cutter point fixedly supported by said tool carrier and of a nature to gather vibratory energy as it operates, and means to absorb and dissipate said vibratory energy.

46. In a high speed machine for accurately finishing an elongate hole in a work piece, an elongate rotary tool support having one end adapted to be secured to a rotatable supporting element and having its other end portion free and adapted to fixedly support a tool and to carry said tool at high rotary speed through the length of said hole, said free end portion being susceptible to transverse vibration, and means supported wholly by said tool support and cooperating with the free end thereof to maintain said free end in alinement with the axis of said tool support.

47. In a high speed machine for accurately finishing an elongate hole in a work piece, an elongate rotary tool carrier having one end adapted to be secured to a rotatable supporting element and having its other end portion free and capable of transverse deflection, said free end portion being adapted to fixedly support a cutter point and to carry the same at high rotary speed through the length of said hole, said cutter point tending to deflect said tool carrier in varying degrees, and means cooperatively acting upon said tool carrier near the location of said cutter point to maintain said deflection within the limit required for accurate finishing.

GEORGE H. LELAND.